April 11, 1939.     A. LINN     2,154,275
ELECTRODE SUPPORTING STRUCTURE
Filed Oct. 30, 1936

WITNESSES:
Leon J. Faza
Wm. C. Groome

INVENTOR
Adolf Linn.
BY
Paul E. Friedemann
ATTORNEY

Patented Apr. 11, 1939

2,154,275

UNITED STATES PATENT OFFICE 2,154,275

ELECTRODE SUPPORTING STRUCTURE

Adolf Linn, Berlin-Siemensstadt, Germany, assignor to Siemens-Schuckertwerke Aktiengesellschaft, Berlin-Siemensstadt, Germany, a corporation of Germany Application October 30, 1936, Serial No. 108,500
In Germany December 7, 1935

4 Claims. (Cl. 248—358)

This invention relates to a holding member for machine elements that are to be resiliently interconnected, as, for instance, the elements of metallic vapor-filled rectifiers.

The use of wire helixes as resilient interconnections in electric discharge devices, that is, resilient interconnections for elements inside the discharge device has already been suggested by the prior art. In such arrangement the wire spring or circular loops are positioned in the two facing grooves of the members to be interconnected. Such methods of interconnection have the disadvantage that the wire loops, during the operation of discharge devices, that is, especially during operation of discharge devices that are subject to vibration as for instance on vehicles, travel, which movement or travel in the facing grooves of the elements interconnected, impairs the reliability of the mounting.

One way to prevent such travel or movement of the wire windings, is to use a wire winding of one winding direction for one portion of the facing furrows or grooves and to use a wire winding of an opposite winding direction for another portion of the facing grooves in the elements that are to be resiliently interconnected. The frictional effects or forces of the successive windings for the two portions of the resilient interconnection thus act on the groove walls in an opposite sense whereby a fairly rigid, or non-traveling interconnection, is secured. With electric discharge devices operating at high temperatures, as most of them do, it is found that this means or method of positioning the wire windings to secure a fixed position for the wire does not entirely suffice. The thermal expansion of the elements surrounding the wire permits the wire windings to become loose.

One object of this invention is to provide for fixing the position of a resilient interconnection between two members with reference to such members. A broad object of this invention is the elimination of the disadvantages, or insufficiencies, of the prior art hereinbefore pointed out.

Other objects and advantages of this invention will become more apparent from a study of the following specification when considered in conjunction with the accompanying drawing, in which.

In accordance with this invention, the wandering of the interconnecting member is prevented by the use of cooperating grooves that define generally a non-circular, preferably, an elliptical boundary, and into which the wire windings are inserted under pressure, or force, so that the individual loops take an inclined position. With this arrangement, one portion of the interconnection may have wire windings wound in one direction and the remaining portion or other piece of the interconnections have wire windings wound in the opposite direction. The wire may also be one continuous piece having two portions wound in opposite directions.

Figure 1:
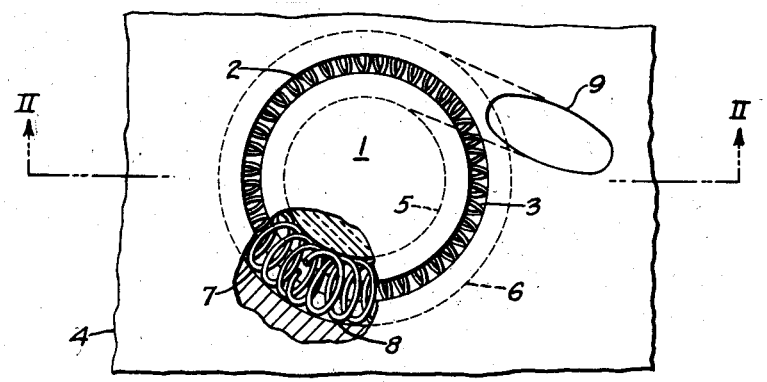
Figure 1 is a plan view, with parts in section, of an embodiment of this invention.

In accordance with the showing in Fig. 1, the element 1 is shown resiliently supported by the two wire windings 2 and 3 on the base 4. The windings 2 and 3 thus constitute the interconnection between elements 1 and 4. These windings 2 and 3 are positioned in the oppositely disposed grooves 5 and 6 so that one takes a position inclined in one direction as shown at 7 and the other takes an inclined position as shown at 8. It is not essential that the resilient interconnecting means be composed of two pieces but one piece having portions wound in opposite directions will serve as well. In fact in some instances the latter construction may be preferable. In the assembly the windings are forced into the coacting grooves 5 and 6 through the aperture 9 in element 4.

Figure 3:
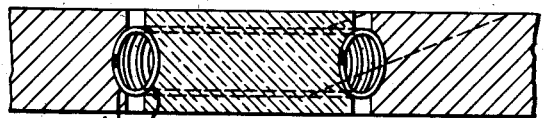
Fig. 3 is a sectional view of a modification of this invention.

In Fig. 3, the shape of the coacting grooves is shown to be different so that the major axis of the generally elliptical boundary for retaining the interconnecting member is vertical. Otherwise the invention is the same.

The supporting structure constituting this invention is especially useful with discharge devices, notably large mercury arc rectifiers. For such apparatus it is not only useful for supporting the anodes, the grids, the cooling system, etc., but also the rectifier vessels themselves may be thus supported. The subject matter of the invention, therefore, finds a general application for all movable power plants, movable rectifier stations, and installations on vehicles.

It should hardly be necessary to mention that the choice of the metal or other material to be used as the interconnecting means and the choice of the material of the elements to be interconnected will be determined by the circumstances of their use.

Figure 2:
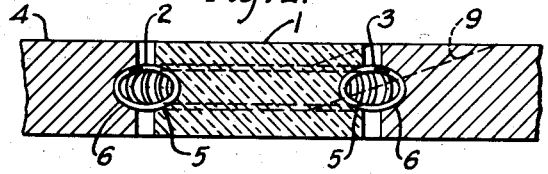
Fig. 2 is a view in section in the plane designated II—II of the subject matter shown in Fig. 1.
Figure 4:
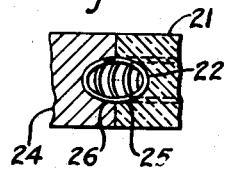
Figs. 4 and 5 are sectional views of still further modifications.
Figure 5:
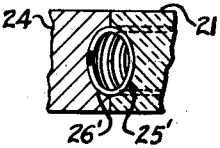

Figs. 4 and 5 show modifications similar to those shown in Figs. 2 and 3 respectively, except that there is no resiliency between the elements 21 and 24 in Fig. 4, because these elements have their facing grooves 25 and 26 defining an ellipse without a spacing. In Fig. 5 the grooves 25' and 26' correspond to grooves 5' and 6' of Fig. 3 without a space between the elements interconnected.

Figure 6:
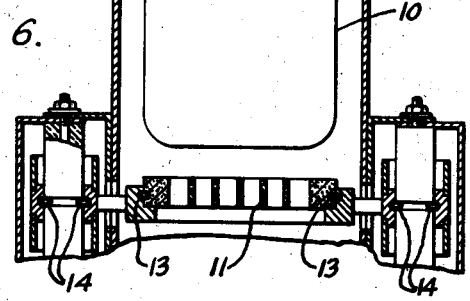
Fig. 6 shows one application of the subject matter of this invention.

Fig. 6 shows one application of this invention. In this figure reference character 10 represents the anode and reference character 11 the control grid of the upper portion of a discharge device or rectifier. It will be noted that the anode 10 and the shield therefore are interconnected by the spring 12 disposed in the grooves shown and distorted to take an elliptical shape. The grid 11 is supported by the interconnecting members 13 and 14.

While only two species of this invention have been herein disclosed, it is not to be taken that such disclosure is exhaustive of the forms this invention may take. The showings are merely illustrative and are not to be taken in a limiting sense, but the invention is only to be limited by the scope of the claims and such prior art as may be pertinent.

I claim as my invention:

1. An interconnection between machine elements comprising an annular member, a cylindrical member adapted to be positioned within the annular member, said annular member and cylindrical member having facing grooves in the facing walls thereof said two grooves defining a generally elliptical space when considered along a plane of section disposed radially of the cylindrical member, wire windings having loops normally of a non-elliptical shape disposed in the elliptical space, for a portion of the length of the space, so that the loops slant in one direction, or sense, with reference to the axis of the windings, and wire windings having loops normally of a non-elliptical shape disposed in the elliptical space for the remaining portion of the length of the space so that the loops slant in an opposite sense to the axis of the windings.

2. In a mounting, the combination of, a member having a cylindrical opening therein, a cylindrical member adapted to fit into the cylindrical opening, said member having facing grooves in the facing cylindrical portions thereof, and a pair of resilient wire windings disposed in the grooves, said pair of wire windings being so disposed in the grooves that the individual loops of one wire winding slant in one manner with reference to the grooves and the individual loops of the other wire winding slant in another manner with reference to the grooves.

3. In a mounting, the combination of, a member having a cylindrical opening therein, a cylindrical member adapted to fit into the cylindrical opening, said member having facing grooves in the facing cylindrical portions thereof, a pair of resilient wire windings disposed in the grooves, said pair of wire windings being so disposed in the grooves that the individual loops of one wire winding slant in one manner with reference to the grooves and the individual loops of the other wire winding slant in another manner with reference to the grooves, and an opening in one of the members terminating in the groove of that member whereby the wire windings may be put in the grooves after the members are in their normal desired position.

4. An interconnection between machine elements comprising an annular member, a cylindrical member adapted to be positioned within the annular member, said annular member and cylindrical member having facing grooves in the facing walls thereof, said two grooves defining a generally elliptical space when considered along a plane of section disposed radially of the cylindrical member, a pair of helical springs disposed in said grooves and having individual turns the peripheral lengths of which are greater than the perimeter of said radial section of the space defined by said grooves so that the individual turns thereof substantially fill the grooves and slope at an angle to the axis of the windings, the individual turns of the two springs sloping in opposite directions.

ADOLF LINN.